United States Patent [19]
Tsuyuki et al.

[11] Patent Number: 5,628,037
[45] Date of Patent: May 6, 1997

[54] PARALLAX CORRECTING MECHANISM FOR REAL IMAGE TYPE VIEWFINDERS

[75] Inventors: Kazuhiro Tsuyuki; Kazuhiko Onda, both of Saitama-ken, Japan

[73] Assignee: Fuji Photo Optical Co., Ltd., Japan

[21] Appl. No.: 544,298

[22] Filed: Oct. 17, 1995

[30] Foreign Application Priority Data

Oct. 19, 1994 [JP] Japan .................................. 6-278552

[51] Int. Cl.⁶ .......................... G03B 13/20; G03B 13/14
[52] U.S. Cl. .......................... 396/140; 396/149; 396/377
[58] Field of Search ....................... 354/219, 163, 354/164, 221, 222; 396/140, 149, 377

[56] References Cited

U.S. PATENT DOCUMENTS

| | | | |
|---|---|---|---|
| 4,268,151 | 5/1981 | Kobori et al. | 354/219 |
| 5,160,954 | 11/1992 | Suzuki et al. | 354/221 |
| 5,404,189 | 4/1995 | Labaziewicz et al. | 354/222 |
| 5,463,438 | 10/1995 | Kosako | 354/221 |

FOREIGN PATENT DOCUMENTS 06218996 3/1993 Japan .................. G03B 13/10

*Primary Examiner*—Safet Metjahic
*Assistant Examiner*—Eric Nelson
*Attorney, Agent, or Firm*—Price, Heneveld, Cooper, DeWitt & Litton

[57] ABSTRACT

A parallax correcting mechanism for a real image type viewfinder, particularly for a real image type viewfinder having a zoom function of high magnification and allowing a desired parallax correction to be easily achieved by swinging a housing for an erecting optical system relative to a housing for an objective side optical system and thereby adjusting a relative position between an optical axis of the objective side optical system and an optical axis of the erecting optical system at its incidence side. More specifically, the housing for the objective side optical system containing therein lens holders serving to hold objective lenses respectively, includes a support hole at a position thereon appropriately spaced from a common optical axis of these objective lenses. A prism holder serving to hold prisms forming the erecting optical system is provided with a support pin projecting therefrom so as to be loosely inserted into the support hole so that the prism holder may be pivotally moved relative to the housing for the objective side optical system around the support pin. This pivotal movement allows the optical axis of the prism at its incidence side to be adjustably positioned relative to the optical axis of the objective lenses, and thereby allows a desired parallax correction to be achieved. An eyepiece is held by an eyepiece holder formed as a part of the prism holder.

26 Claims, 5 Drawing Sheets

PARALLAX CORRECTING MECHANISM FOR REAL IMAGE TYPE VIEWFINDERS

BACKGROUND OF THE INVENTION

1. Field of the Invention

The present invention relates to a parallax correcting mechanism for a photographic real image type viewfinder and more particularly for such viewfinder having a zoom capability.

2. Description of the Related Art

Photographic cameras equipped with an objective lens having a zoom capability have been widely used to ensure that the user can enjoy photography and easily photograph for a variety of purposes. As a recent trend, a higher magnification is demanded for this zoom functionality to meet the requirements for multi-purpose photographing.

Popular photographic cameras have usually been equipped with a direct viewfinder of virtual or real image type and the viewfinder itself has been required to have a zoom capability that is dependent on the zoom function of the photographic objective lens. Additionally, as the zooming magnification of the photographic lens has been improved, it has become more and more important for such viewfinders to have a zoom capability of correspondingly higher magnification. Such popular photographic cameras have generally been equipped with a real image type viewfinder in order to realize a photographic camera that has an increased zoom capability while sacrificing compactness.

The real image type viewfinder generally comprises an objective lens serving to form an inverted image of an object to be photographed, an erecting optical system serving to convert this inverted image to an erected image enlarged so as to be observed as a real image, and a field frame defining an image plane of this real image. Accordingly, when dust or dirt enters the viewfinder and clings to an area adjacent the field frame, such dust or dirt will be enlarged and seriously obstruct observation of the object to be photographed. To overcome this problem, the conventional real image type viewfinder comprises an objective side optical system and an ocular side optical system both contained within a common sealed casing so that dust or dirt can be prevented as perfectly as possible from entering the viewfinder.

However, increased zooming magnification of the viewfinder inevitably causes the following problems. With the classic viewfinder, both the working accuracy and the positioning accuracy of the components constituting the viewfinder optical system did not practically affect parallax and were negligible even when a sealed viewfinder unit was mounted on a camera body because the classic viewfinder was of a relatively low magnification. Accordingly, no parallax correction was necessary after the viewfinder had been mounted on the camera body. However, as the zoom magnification of the viewfinder has been increased, the working accuracy and the positioning accuracy of the optical components constituting the viewfinder have caused a significant error with respect to a theoretical parallax expected after assembly of the viewfinder. Efforts to improve the working accuracy and the positioning accuracy of the components sufficiently to eliminate the error generated during assembly of the viewfinder increases working costs of the components and therefore increases manufacturing costs of the photographic camera. This is one reason why parallax correction is necessary after assembly of the viewfinder.

So far as an Albada viewfinder is concerned, such parallax correction can be achieved by moving the field frame and/or the lenses. However, it is impossible for the real image type viewfinder to move various components such as the field frame and the prisms since viewfinders of this type have a sealed structure. Furthermore, it is also impossible to move the lenses of the objective side optical system since these lenses are adapted to be zooming-driven. For these reasons, parallax correction of the real image type viewfinder has conventionally been difficult.

SUMMARY OF THE INVENTION

In view of the above problems, it is a principal object of the invention to provide a parallax correcting mechanism for a real image type viewfinder allowing a desired parallax correction to be achieved so as to cope with the recent tendency of increasing the zooming magnification more and more in this class of popular photographic cameras. Additional features and advantages of the present invention will be set forth in part in the description which follows and in part will be apparent from the description, or may be learned by practice of the invention.

The object set forth above is achieved, according to an aspect of the invention, by a parallax correcting mechanism for a real image type viewfinder including an objective side optical system, an erecting optical system, and an ocular side optical system, the parallax correcting mechanism comprises a first housing for holding and containing the objective side optical system, and a second housing for containing at least the erecting optical system. The second housing has a support pin, and is supported by the first housing pivotally about the support pin. The support pin is appropriately spaced from an optical axis of the objective side optical system and a desired parallax correction is carried out by swinging the second housing about the support pin and thereby swinging an optical axis of the erecting optical system at its incidence side about the support pin.

The object set forth above is achieved, according to another aspect of the invention by a parallax correcting mechanism for a real image type viewfinder including an objective side optical system, an erecting optical system, and an ocular side optical system, the parallax correcting mechanism comprises a first housing for holding and containing the objective side optical system, the first housing includes a support hole at a position thereon appropriately spaced from an optical axis of the objective side optical system, and a second housing for containing at least the erecting optical system, and having a support pin loosely inserted into the support hole such that the second housing may be pivoted about the support pin. A desired parallax correction is carried out by swinging the second housing about the support pin and thereby swinging an optical axis of the erecting optical system at its incidence side about the support pin.

The object set forth above is achieved, according to still another aspect of the invention, by a parallax correcting mechanism for a real image type viewfinder including an objective side optical system, an erecting optical system, and an ocular side optical system, the parallax correcting mechanism comprises a first housing holding and containing the objective side optical system, the first housing having a support pin formed at a position thereon spaced from an optical axis of the objective side optical system, and a second housing for containing at least the erecting optical system and having a support hole into which the support pin is loosely inserted for supporting the first housing pivotally about the support pin. A desired parallax correction is carried out by swinging the second housing about the support pin and thereby swinging an optical axis of the erecting optical system at its incidence side about the support pin.

To meet a requirement that the field of the viewfinder should be preferably changed depending on an image angle which depends, in turn, on a zoom position of a zoom lens assembly for a photographic camera, the objective side optical system is operatively associated with the zoom driving of the zoom lens assembly so that lenses constituting the objective side optical system are moved back and forth along its optical axis for zooming. Not only to facilitate the assembly of a camera but also to reduce the number of parts, the first housing for the objective side optical system is mounted on a part of an auto-focussing sensor casing which holds light projector means as well as light receiving means. To ensure that the number of parts can be further reduced, a flash tube for prevention of so-called red eye phenomenon is held by the auto-focussing sensor casing.

To facilitate an operation of assembling the erecting optical system and to ensure that any dust or dirt can be easily removed should such dust or dirt enter the erecting optical system, the second housing for the erecting optical system includes a prism holder adapted to hold an upper portion of the erecting optical system and a prism cover for covering a lower portion of the erecting optical system so that the prism holder and the prism cover seal up and hold together the erecting optical system. Preferably, the ocular side optical system is contained within the second housing for the erecting optical system and the ocular side optical system is moved back and forth along its optical axis to achieve a diopter movement.

To minimize an amount of adjustment required for parallax correction, a distance between the support pin of the erecting optical system and the optical axis of the ocular side optical system is selected to be appropriately shorter than a distance between the optical axis of the objective side optical system and the support pin.

Preferably, the erecting optical system is provided with a field frame plate and there are further provided field frame mask plates pivotally movable with respect to the field frame plate between a pair of positions at which the field frame plates are partially covered by the field frame mask plates and another pair of positions at which the field frame plates are not covered so that the field frame plate may be switched between a normal size photographing mode and a panorama size photographing mode.

Pivotal movement of the second housing for the erecting optical system about the support pin causes the optical axis of the erecting optical system to swing about the support pin. In the course of such swing, a coincidence between the field of the photographic lens and the field of the viewfinder at a predetermined range to an object to be photographed is detected and thereupon the housing for the erecting optical system may be fixed to the housing for the objective side optical system to achieve a desired parallax correction.

The support pin may be sufficiently spaced from the optical axis of the erecting optical system at its incidence side to obtain a substantially linear movement of the optical axis at the incidence side by swinging the housing for the erecting optical system. In this manner, the effect is obtained as if the optical axis of the erecting optical system at its incidence side is adjustably moved in one direction.

With the ocular side optical system contained within the second housing for the erecting optical system, the ocular side optical system also swings as the second housing for the erecting optical system swings. However, a movement of the ocular side optical system's optical axis can be negligibly minimized by an arrangement such that a distance between this optical axis and the axis around which the housing for the erecting optical system swings is shorter than a distance between the axis and the optical axis of the erecting optical system at its incidence side.

The features and advantages of the invention may be realized and obtained by means of the instrumentalities and combinations particularly pointed out in the written description and claims hereof, as well as the appended drawings.

BRIEF DESCRIPTION OF THE DRAWINGS

The accompanying drawings, which are incorporated in, and constitute a part of, this specification illustrate several embodiments of the invention and together with the description, serve to explain the objects, advantages, and principles of the invention. In the drawings.

DETAILED DESCRIPTION OF THE PREFERRED EMBODIMENTS

Details of the inventive parallax correcting mechanism for a real image type viewfinder will be readily understood from the following description of a specific embodiment made in reference to the accompanying drawings.

Figure 1:
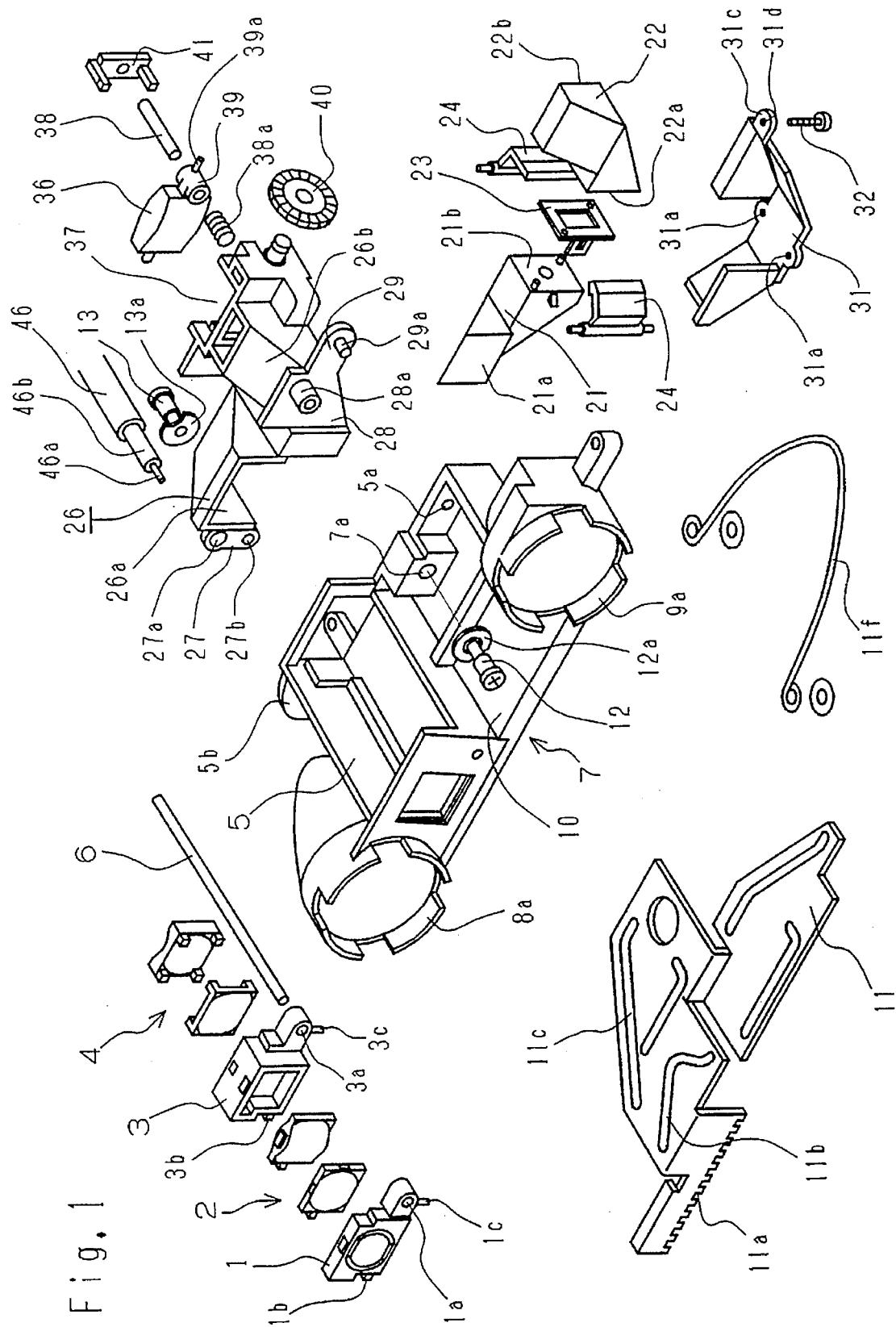
FIG. 1 is an exploded perspective view schematically illustrating a construction of a parallax correcting mechanism for a viewfinder of real image type according to the invention.

FIG. 1 is an exploded perspective view schematically illustrating a real image type viewfinder equipped with the parallax correcting mechanism of the present invention. An objective side optical system comprises a first objective lens 2 held by a first holder 1 and a second objective lens 4 held by a second holder 3 both contained within an objective side optical system housing 5. The first and second holders 1, 3 are formed with lugs projecting laterally from one side. These lugs include support holes 1a, 3a, respectively, extending therethrough in parallel to the optical axis so that a guide rod 6 supported within the objective side optical system housing 5 in parallel to the optical axis may be loosely inserted through the support holes 1a, 3a, to support first and second holders 1, 3. The first and second holders 1, 3 are provided with guide pins 1b, 3b, respectively, projecting outward from sides opposite the lugs so as to be loosely engaged with respective guide grooves (not shown) formed in the inner surface of the objective side optical system housing 5. In this manner, these first and second holders 1, 3 can be guided back and forth by the guide rod 6 in parallel to the optical axis within the objective side optical system housing 5. The lugs having the respective support holes 1a, 3a, of the first and second holders 1, 3 are provided on their bottom sides with drive pins 1c, 3c, respectively, projecting downward. By moving lenses 2, 4, a zooming function may be performed corresponding to the zooming operation of the photographic lens of the camera.

Figure 2:
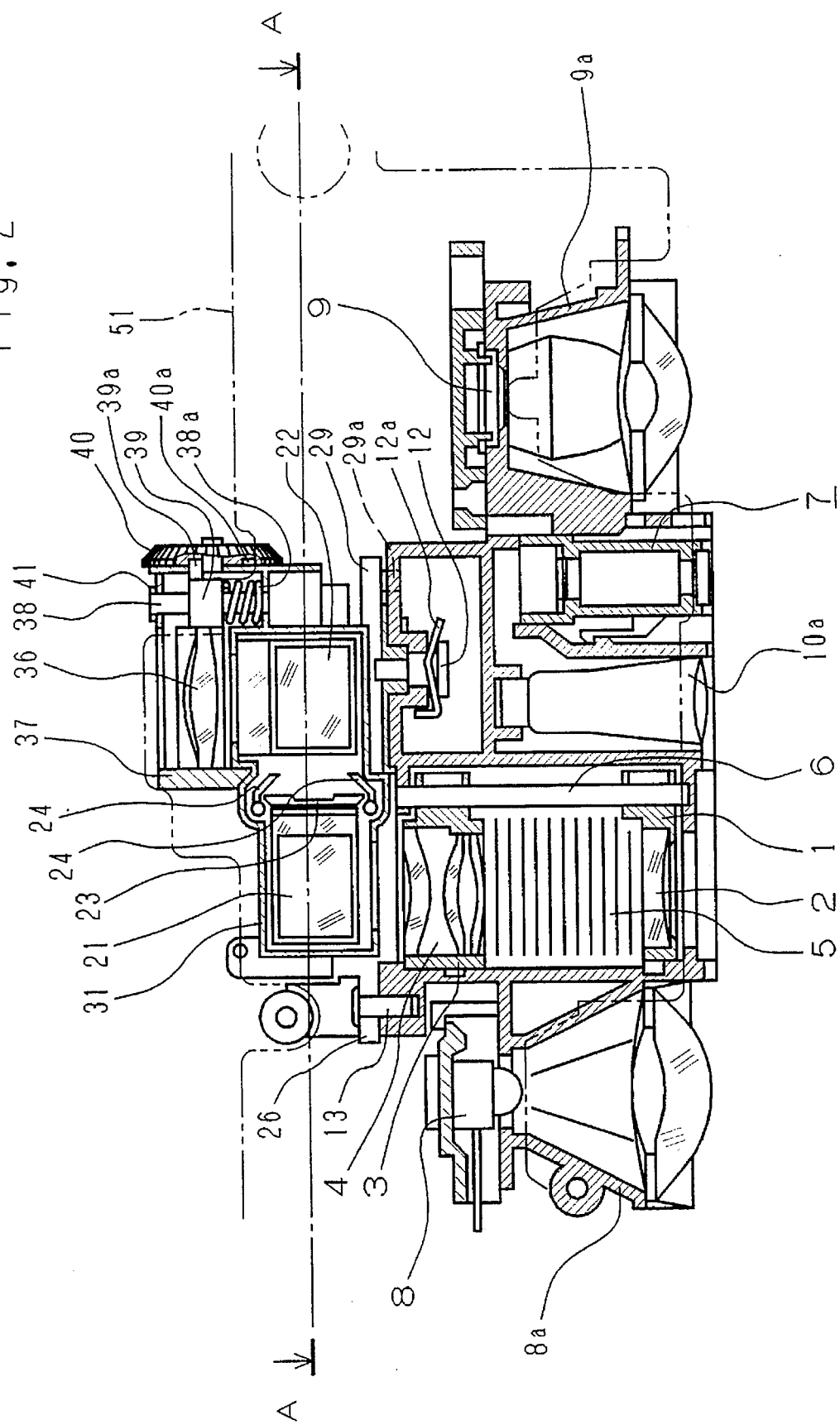
FIG. 2 is a schematic plan view illustrating this parallax correcting mechanism for the viewfinder of real image type as the viewfinder being partially eliminated.

The objective side optical system housing 5 forms a part of an auto-focussing sensor casing (referred to hereinafter simply as AF casing) 7 which holds light projector means 8 and light receiver means 9 (FIG. 2). The AF casing 7 is formed at its opposite sides with light projector means holder 8a serving to house the light projector means 8 and light receiver means holder 9a serving to house the light receiver means 9. The objective side optical system housing 5 lies closely adjacent the light projector means holder 8a. Closely adjacent the light receiver means holder 9a, there is provided a preceding flash tube holder 10 serving to hold a so-called red eye preventive flash tube 10a (FIG. 2) used for stroboscopic photographing.

The AF casing 7 is provided on its bottom side with a cam plate 11 so as to be slidable in a direction substantially orthogonal to the optical axis. This cam plate 11 is formed partially along its front edge with a rack 11a adapted to be engaged with a pinion driven by a lens barrel driving motor (not shown) and to be slidably moved as the pinion is rotated. A portion of this cam plate 11 just underlying the objective side optical system housing 5 is formed with cam grooves 11b, 11c for the viewfinder so that the drive pins 1c, 3c projecting from the first and second holder 1, 3, respectively, may be loosely inserted into these cam grooves 11b, 11c, respectively. The cam grooves 11b, 11c for the viewfinder are so configured that the first and second objective lenses 2, 4 separately held by the first and second holders 1, 3, respectively, which are movably guided by the cam grooves 11b, 11c for the viewfinder as the cam plate 11 is slidably moved, may be moved back and forth in parallel to the optical axis without departing from an optical relationship predetermined between these two objective lenses 2, 4 and thereby a desired zooming effect may be achieved. Between this cam plate 11 and the AF casing 7 there is disposed a counter spring 11f comprising a wire spring functioning to bias the respective drive pins 1c, 3c against respective inner surfaces of the cam grooves 11b, 11c for the viewfinder.

Figure 3:
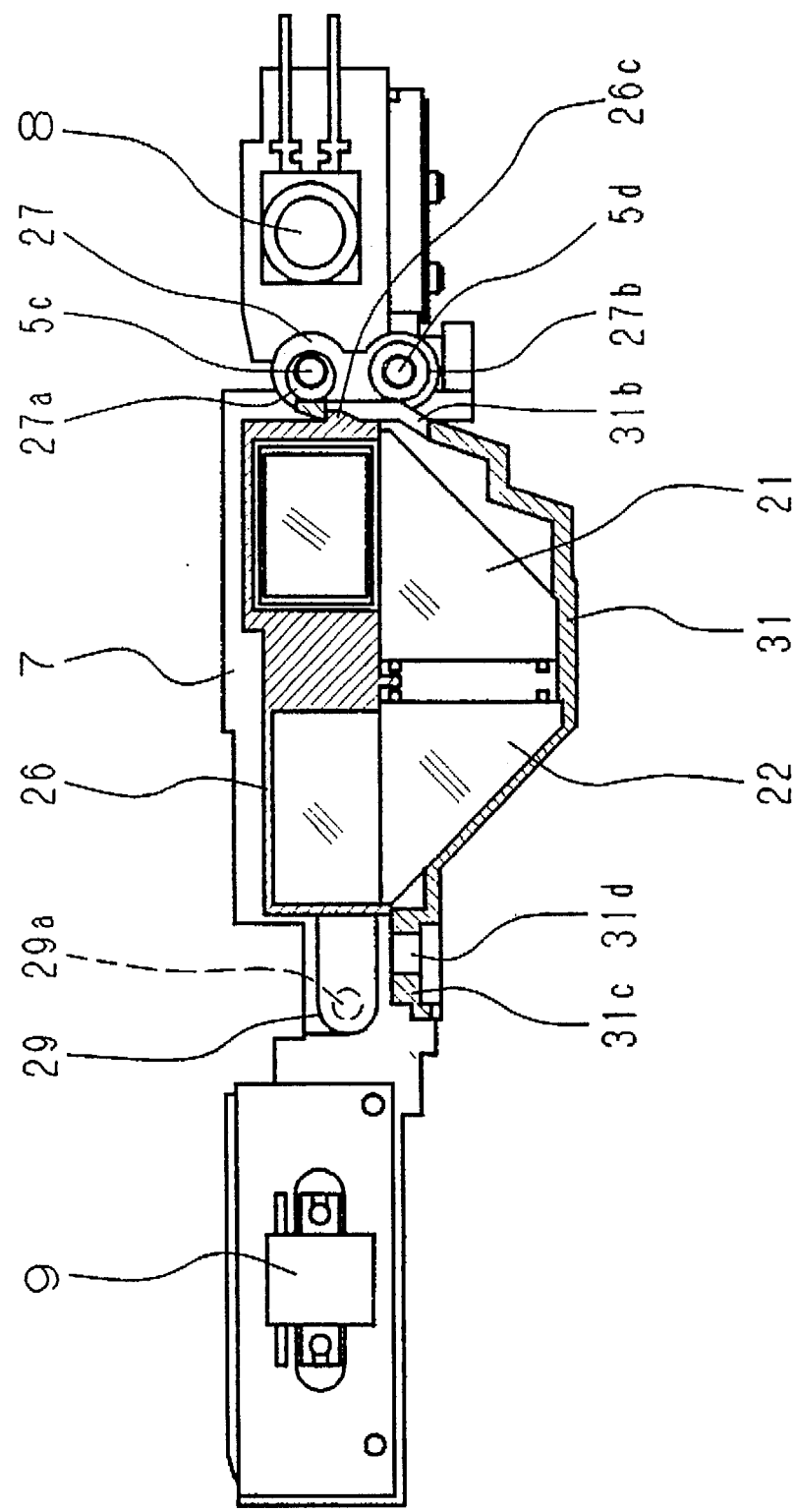
FIG. 3 is a schematic sectional view taken along a line A—A in FIG. 2 as partially cut away.

A rear wall of the AF casing 7 is formed at a position appropriately spaced from the optical axis of the objective lenses 2, 4 substantially in a horizontal direction with a support hole 5a extending in parallel to the optical axis of the objective side optical system. The rear wall of the AF casing 7 is further formed between this support hole 5a and the objective side optical system housing 5 with a positioning cylindrical recess 7a opening forward and formed in its bottom with a through-hole adapted to receive a setscrew 12. A spring washer 12a is loosely put around setscrew 12. The objective side optical system housing 5 is formed at one of its rear corners with a laterally extending mount lug 5b which is, in turn, formed at its lower portion with a screw hole 5d (FIG. 3) into which a setscrew 13 (FIG. 2) is threaded. A spring washer 13a is loosely put around this setscrew 13. This mount lug 5b is further formed at its upper portion with an adjustable supporting hole 5c adapted for loosely receiving a tip pin of a jig as will be described later in reference to FIG. 3.

An erecting optical system comprises a pair of prisms 21,22 of which the first prism 21 has its incidence surface behind the second objective lens 4 of the objective side optical system and a pair of reflective surfaces adapted to reflect an image of the object to be photographed produced by the objective side optical system in a direction substantially orthogonal to the optical axis of the objective side optical system so that this reflected image emerges from an exit surface 21b of the first prism 21. An incidence surface 22a of the second prism 22 is opposed to the exit surface 21b of the first prism 21 and the image of the object to be photographed reflected on the first prism 21 now enters an incidence surface 22a of the second prism 22. The image of the object to be photographed having entered the second prism 22 is then reflected on a pair of reflective surfaces and emerges from an exit surface 22b substantially in parallel to the optical axis of the objective side optical system.

The exit surface 21b of the first prism 21 is provided with a field frame plate 23 serving to define a viewfinder field. In this specific embodiment, it is assumed that the viewfinder is mounted on a photographic camera adapted to be loaded with 35 mm film roll and to be selectively switched between a normal photographing mode in which a film frame in a full size of 24 mm×36 mm is exposed to make a normal size picture and a panoramic photographing mode in which a film frame in a size long from side to side of approximately 16 mm×36 mm is exposed to make a panorama size picture, wherein a pair of field frame mask plates 24 are pivotally supported between the exit surface 21b of the first prism 21 and the incidence surface 22a of the second prism 22 so that these field frame mask plates 24 may be rotated and overlap transversely opposite edges of the field frame plate 23 to define a viewfinder field of the panoramic size, on one hand, and the opposite edges may be freed to define a viewfinder field of the normal size, on the other hand.

The erecting system comprising the prisms 21, 22 is held by a prism holder 26 in the form of a housing serving to hold upper portions of these prisms 21, 22. As shown by FIG. 1, the prism holder 26 comprises a first holder section 26a to hold the first prism 21 and a second holder section 26b to hold the second prism 22 both of which are formed integrally with each other.

The first holder section 26a is provided along its front outer edge with a mount bracket 27 laterally projecting therefrom so as to be brought in contact face to face with the mount lug 5b of the objective side optical system housing 5. The mount bracket 27 is formed with an adjustment hole 27a positioned in alignment with the adjustably supporting hole 5c (FIG. 3) of the lug 5b and having a diameter appropriately larger than that of the adjustably supporting hole 5c and with a through-hole 27b positioned in alignment with the screw hole 5d (FIG. 3) so as to receive the setscrew 13 when the latter is threaded into the screw hole 5d.

The second holder 26b for the second prism 22 has a wall 28 defining its front side and this wall 28 is provided with a positioning pin 28a projecting forward and adapted for loosely inserting within a positioning cylindrical recess 7a which is formed in the AF casing 7, which is, in turn, formed with a screw hole into which the setscrew 12 is threaded. A part of the wall 28 laterally extends to form a flange 29 which is provided with a support pin 29a projecting forward in parallel to the optical axis of the objective optical system so as to be loosely inserted into the support hole 5a formed in the AF casing 7. In this manner, the prism holder 26 is pivotally supported by support pin 29a and support hole 5a. While the AF casing 7 is formed with the support hole 5a and the flange 29 of the prism holder 26 is formed with the support pin 29a according to the present embodiment, it is also possible without departing from the scope of the invention to form the AF casing 7 with the support pin and the flange 29 with the support hole into which the support pin is loosely inserted.

There is provided under the prism 21, 22 held by the prism holder 26 a prism cover 31 covering lower portions of these prisms 21, 22 and cooperating with the prism holder 26 holding the upper portions of these prisms 21, 22 substantially to seal up the erecting optical system. A middle section of the prism cover 31 is formed at positions on opposite edges as viewed in the direction of the optical axis with support holes 31a, 31a, respectively, serving to receive lower ends of the respective pins by which the pair of field frame mask plates 24 are pivotally operated. Likewise, the prism holder 26 is formed at the corresponding positions with a pair of support holes (not shown) serving to receive upper ends of the respective pins by which the pair of field frame mask plates 24 are pivotally operated.

In this specific embodiment, an eyepiece 36 constituting an ocular side optical system is held by the prism holder 26. More specifically, opposed to the exit surface 22b of the second prism 22 held by the prism holder 26, an eyepiece holder section 37 in the form of a housing for the eyepiece 36 is formed integrally with the prism holder 26. A guide rod 38 extends along one side wall within the eyepiece holder section 37 in parallel to an optical axis of this eyepiece 36 and loosely inserted through a portion of an eyepiece frame 39 holding the eyepiece 36 so that the eyepiece 36 may be guided along the guide rod 38 back and forth. On the outside of the eyepiece holder section 37, a diopter movement dial 40 is rotatably supported and this diopter movement dial 40 is formed in its inner surface as shown by FIG. 2 with a circulator cam groove 40a around a position which is eccentric with respect to its shaft. An input pin 39a projects outward from the portion of the eyepiece frame 39 and loosely inserted into the cam groove 40a. With such arrangement, the cam groove 40a is eccentrically rotated as the diopter movement dial 40 is rotated and thereby the eyepiece frame 39 having the input pin 39a loosely inserted into the cam groove 40a is guided along the guide rod 38 back and forth in parallel to the optical axis of the eyepiece 36 to move the eyepiece 36 back and forth along the optical axis. The guide rod 38 is loosely surrounded by a counter spring 38a in the form of a compression spring so that a restoring force thereof may bias the eyepiece frame 39, i.e., causing the eyepiece 36 to be moved back. With the eyepiece 36 being held by the eyepiece holder 37, the guide rod 38 is supported by a holder plate 41 fixed to a rear end of the guide rod 38.

Referring to FIG. 1, reference numeral 46 designates an adjuster jig having a tip pin 46a, which is destined to be loosely inserted into the adjustably supporting hole 5c formed in the mount lug 5b of the objective side optical system housing 5, and an adjusting cylindrical portion 46b being continuous with the rear end of the tip pin 46a and destined to be loosely inserted into the adjustment hole 27a formed in the mount bracket 27. The tip pin 46a eccentrically projects from the adjusting cylindrical portion 46b.

Figure 4:
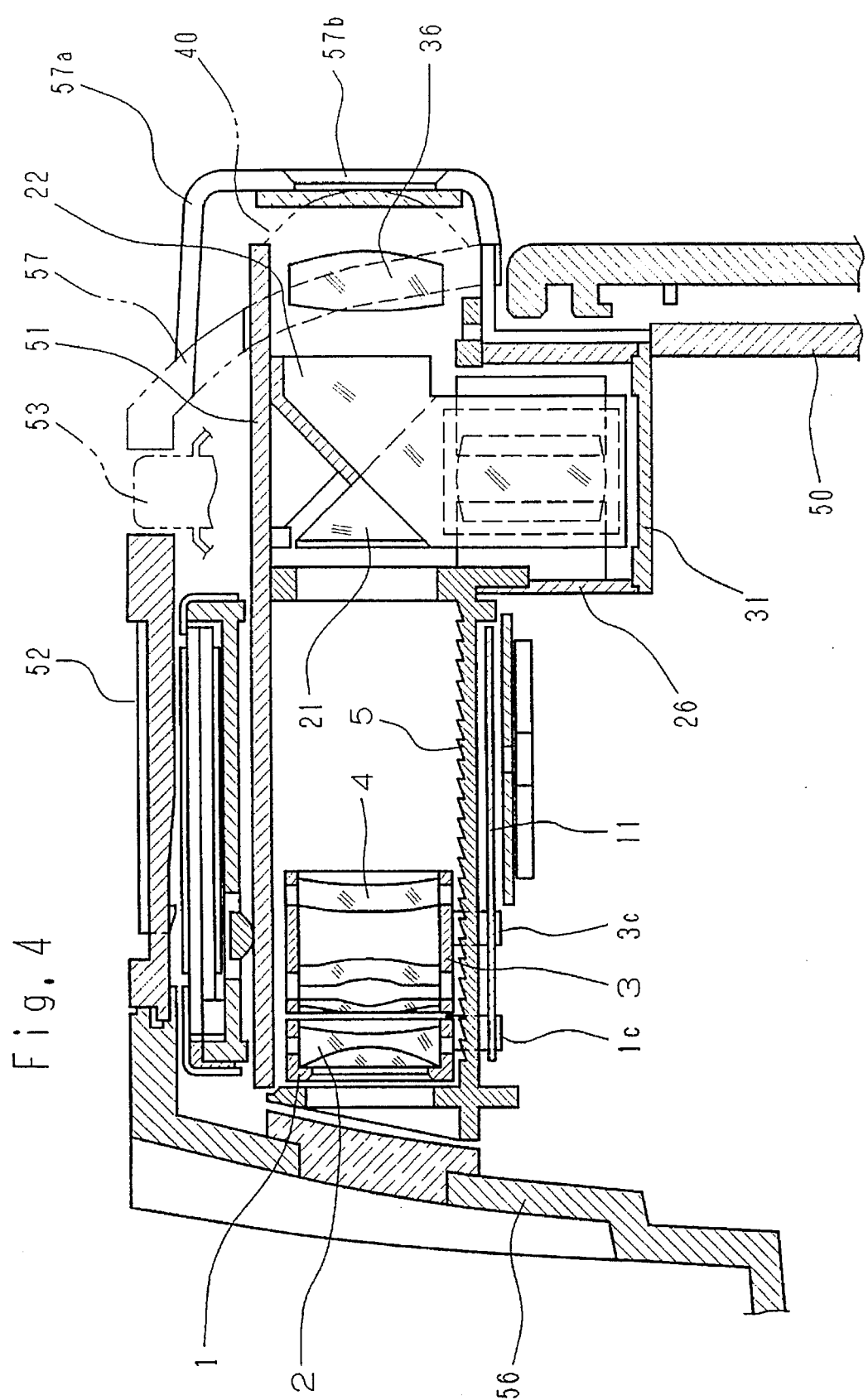
FIG. 4 is a schematic sectional side view illustrating an upper part of a photographic camera equipped with the viewfinder of real image type including this parallax correcting mechanism, as partially eliminated.
Figure 5:
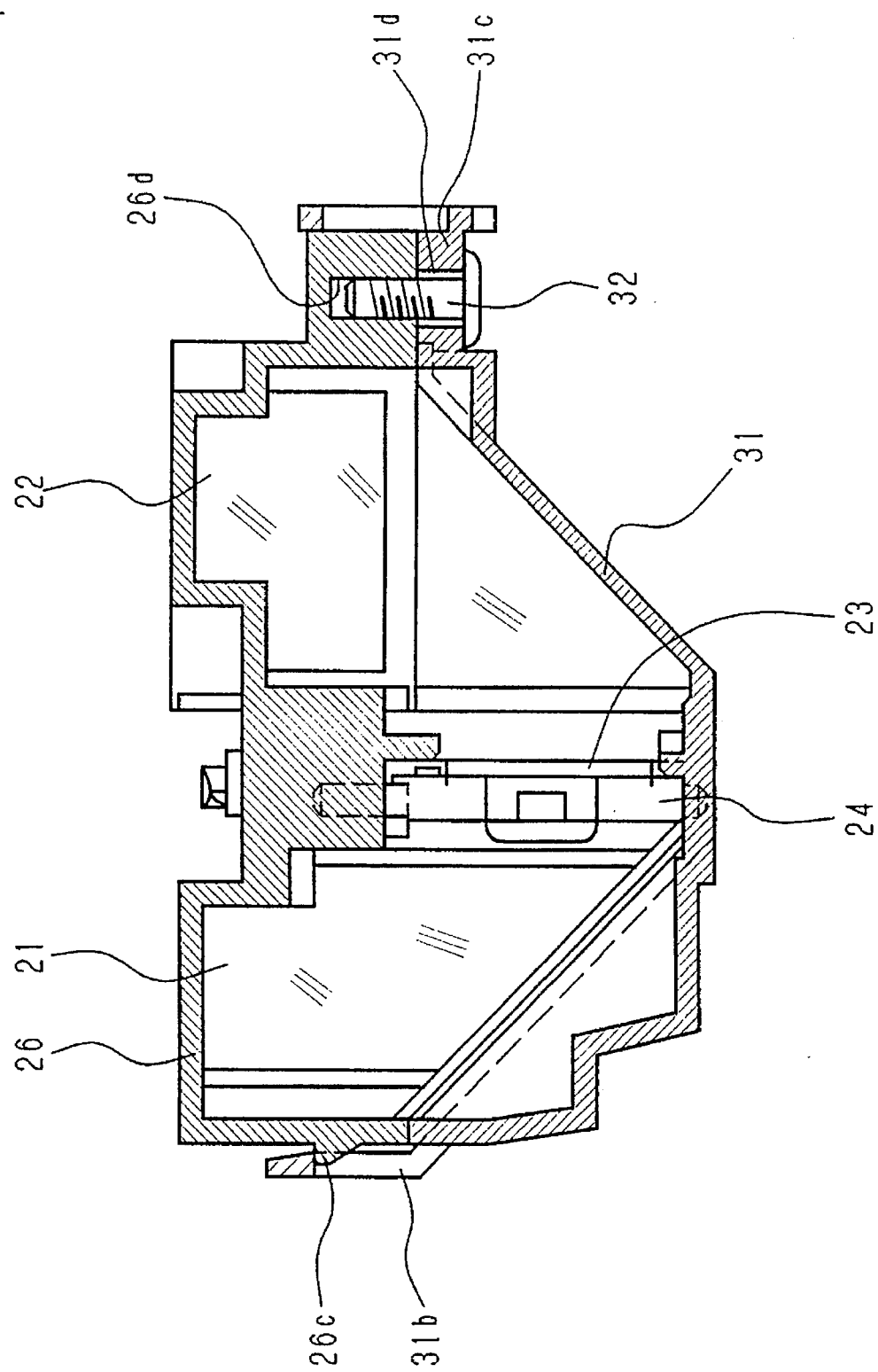
FIG. 5 is a schematic sectional front view illustrating a manner in which an erecting optical system is held, as partially eliminated.

A viewfinder unit comprising the AF casing 7, the prism holder 26, and the prism cover 31, etc. fixed to the AF casing 7 is mounted on an upper part of a camera body 50, as shown by FIG. 4. As will be apparent from FIGS. 2 and 4, above this viewfinder unit there is provided a print substrate 51 on which a control circuit is printed to control various functions such as auto-exposure and auto-focussing of the photographic camera. Above this print substrate 51, there are provided a liquid crystal display 52 and various switches 53, as will be seen in FIG. 4. The camera body 50 thus equipped with the viewfinder unit, the print substrate 51, etc. may be covered with a front cover 56 as well as with a rear cover 57 to accomplish an appearance of the photographic camera. A portion of the rear cover 57 projects rearward so as to form a viewfinder's ocular frame 57a at which the eyepiece holder 37 of the viewfinder is positioned. The ocular frame 57a is formed in its rear wall with an opening 57b through which the user looks into the viewfinder. The diopter movement dial 40 has its rear end positioned adjacent an edge of the opening 57b lateral of the viewfinder's ocular frame 57a so that the diopter movement dial 40 may be rotated with a bulb of the user's finger bearing against this.

The specific embodiment of the inventive parallax correcting mechanism for the viewfinder of real image type constructed as has been described hereinabove operates as follows. The light projector means 8, the light receiver means 9, and the red eye preventing flash tube 10a are assembled into the light projector holder 8a, the light receiver holder 9a, and the preceding flash tube holder 10, respectively. Then, the first holder 1 for the first objective lens 2 as well as the second holder 3 for the second objective lens 4 are assembled into the objective housing 5 and then the cam plate 11 is assembled thereto. Next, the various elements such as the first prism 21, the second prism 22, the field frame plate 23, the field frame mask plate 24, the eyepiece 36 and the diopter movement dial 40 are assembled into the prism holder 26, of which the bottom is covered with the prism cover 31 for substantially sealing up the erecting optical system.

The support pin 29a of the prism holder 26 and the positioning pin 28a are loosely inserted into the support hole 5a and the positioning hole 7a of the AF casing 7, respectively. With the mount bracket 27 placed against the mount lug 5b, the prism holder 26 is provisionally fixed to the rear side of the AF casing 7 by the setscrews 12 and 13. In this state, the adjustably supporting hole 5c of the mount lug 5b is positioned inside the adjustment hole 27a formed in the mount bracket 27.

The viewfinder unit having the prism holder 26 thus previously fixed to the AF casing 7 is now fixed to the upper part of the camera body 50. Then, the print substrate 51 carrying predetermined circuitry is fixed together with the other elements to the top of the viewfinder unit. Thus, the photographic camera is made ready to be driven and thereby ready for parallax correction. The adjuster jig 46 is inserted through the adjustment hole 27a of the mount bracket 27 and the tip pin 46a of the adjuster jig 46 is loosely inserted into the adjustably supporting hole 5c of the mount lug 5b. In this state, the adjusting cylindrical portion 46b of the adjuster jig 46 is loosely inserted into the adjustment hole 27a of the mount bracket 27. With the camera body 50 directed to a test chart or the like lying at a predetermined position, the test chart is picked up by the photographic lens (not shown). From this state, the adjuster jig 46 is rotated around the tip pin 46a as the adjuster jig 46 is rotationally driven. Rotation of the adjuster jig 46 causes the adjusting cylindrical portion 46b having the tip pin 46a projecting therefrom eccentrically thereof to be rotated around the tip pin 46a. As a result, the prism holder 26 including this adjusting cylindrical portion 46b loosely inserted into the adjustment hole 27a swings around the support pin 29a. A distance between the support pin 29a around which the prism holder 26 swings and the optical axis of the first prism 21 at its incident side is sufficiently larger than an extent over which the prism holder 26 can swing under limitation by an eccentricity of the tip pin 46a to support a consideration that the optical axis of the first prism 21 presents substantially linear movement in a vertical direction as the prism holder 26 swings.

With the given test chart being picked up through the viewfinder, a parallax can be maintained within a predetermined allowable amount by adjustably rotating this prism holder 26 so that a predetermined portion of the test chart can be caught within the frame.

Upon completion of such adjustment, the set screws 12, 13 are tightened to fix the prism holder 26 to the AF casing 7. Assembly is completed by covering the camera body 50 with the front cover 56 as well as with the rear cover 57.

With the viewfinder according to this embodiment, the desired diopter movement can be achieved by rotating the diopter movement dial 40 with the bulb of the user's finger or the like, since the rear end of the diopter movement dial 40 is exposed from the rear cover 57 of the photographic camera. Specifically, the eyepiece 36 can be moved back and forth by rotating the diopter movement dial 40, so the eyepiece 36 can be adjusted to the diopter of the particular user by moving the eyepiece 36 back and forth until an image of the object to be photographed becomes sharp.

If dust or dirt enters the viewfinder adjacent the field frame plate 23, the viewfinder unit may be dismantled together with the print substrate 51 from the camera body 50 and then the prism cover 31 may be also dismantled from the prism holder 26 to expose the field frame plate 23 and thereby to remove the dust or dirt.

While the embodiment has been described hereinabove as having the eyepiece 36 held by the eyepiece holder 37 formed integrally with the prism holder 26, it is also possible without departing from the scope of the invention to provide the eyepiece holder 37 separately of the prism holder 26 and to detachably mount this on the prism holder 26 at a predetermined position thereof.

As will be apparent from the foregoing description, the inventive parallax correcting mechanism for the viewfinder of real image type allows the desired correction to be easily achieved with a simplified construction, since the erecting optical system housing is pivotally supported relative to the objective system housing so that the optical axis of the erecting optical system at its incidence side may be moved with respect to the optical axis of the objective optical axis to correct the parallax.

Operation of parallax correction can be achieved more easily and reliably than it would be when the relatively heavy erecting optical system must be moved vertically as well as horizontally. Accordingly, the correcting mechanism of the invention is suitable for the real image type viewfinder or the like in which the field frame and the eyepiece need not be moved for desired parallax correction and particularly for real image type viewfinders provided with a function of variable power.

The above embodiments were chosen for purposes of describing but one application of the invention. It will be understood by those who practice the invention and by those skilled in the art, that various modifications and improvements may be made to the invention without departing from the spirit of the disclosed concepts. The scope of protection afforded is to be determined by the claims and by the breadth of interpretation allowed by law.

The embodiments of the invention in which an exclusive property or privilege is claimed are defined as follows.

What is claimed is:

1. A parallax correcting mechanism for a real image type viewfinder including an objective side optical system, an erecting optical system and an ocular side optical system, said parallax correcting mechanism comprising:

a first housing for holding and containing said objective side optical system; and a second housing for containing at least said erecting optical system, said second housing having a support pin and supported by said first housing pivotally about said support pin, wherein said support pin is spaced from an optical axis of said objective side optical system, and wherein parallax correction is carried out by swinging said second housing about said support pin and thereby pivoting an optical axis of the erecting optical system at its incidence side about said support pin.

2. The parallax correcting mechanism as defined in claim 1, wherein said support pin extends in parallel to the optical axis of said objective side optical system.

3. The parallax correcting mechanism as defined in claim 1 and further including means for moving lenses constituting said objective side optical system back and forth along the optical axis thereof to obtain a desired zooming effect corresponding to a zooming effect obtained by a photographic lens of the camera.

4. The parallax correcting mechanism as defined in claim 1, wherein said second housing includes a prism holder adapted to hold an upper portion of said erecting optical system and a prism cover for covering a lower portion of said erecting optical system whereby said prism holder and said prism cover seal up and hold together said erecting optical system.

5. The parallax correcting mechanism as defined in claim 1, wherein said ocular side optical system is contained within said second housing.

6. The parallax correcting mechanism as defined in claim 1 and further including means for moving said ocular side optical system back and forth along its optical axis to achieve a desired diopter movement.

7. The parallax correcting mechanism as defined in claim 1, wherein a distance between said support pin of said erecting optical system and the optical axis of said ocular side optical system is shorter than a distance between the optical axis of said objective side optical system and said support pin.

8. A parallax correcting mechanism for a real image type viewfinder including an objective side optical system, an erecting optical system, and an ocular side optical system, said parallax correcting mechanism comprising:

a first housing for holding and containing said objective side optical system, said first housing having a support hole formed at a position spaced from an optical axis of said objective side optical system; and a second housing for containing at least said erecting optical system, said second housing having a support pin loosely inserted into said support hole such that said second housing pivoted about said support pin, wherein parallax correction is carried out by swinging said second housing about said support pin and thereby pivoting an optical axis of the erecting optical system at its incidence side about said support pin.

9. The parallax correcting mechanism as definded in claim 8, wherein said support pin extends in parallel to the optical axis of said objective side optical system.

10. The parallax correcting mechanism as defined in claim 8 and further including means for moving lenses constituting said objective side optical system back and forth along the optical axis thereof to obtain a desired zooming effect corresponding to a zooming effect obtained by a photographic lens of the camera.

11. The parallax correcting mechanism as defined in claim 8, wherein said second housing includes a prism holder adapted to hold an upper portion of said erecting optical system and a prism cover for covering a lower portion of said erectiong optical system whereby said prism holder and said prism cover seal up and hold together said erecting optical system.

12. The parallax correcting mechanism as defined in claim 8, wherein said ocular side optical system is contained within said second housing.

13. The parallax correcting mechanism as defined in claim 8 and further including means for moving said ocular side optical system back and forth along its optical axis to achieve a desired diopter movement.

14. The parallax correcting mechanism as defined in claim 8, wherein a distance between said support pin of said erecting optical system and the optical axis of said ocular side optical system is shorter than a distance between the optical axis of said objective side optical system and said support pin.

15. A parallax correcting mechanism for a real image type viewfinder including an objective side optical system, an erecting optical system, and an ocular side optical system, said parallax correcting mechanism comprising:

a first housing holding and containing said objective side optical system said first housing having a support pin formed at a position spaced from an optical axis of said objective side optical system; and a second housing for containing at least said erecting optical system, said second housing having a support hole into which said support pin is loosely inserted for supporting said first housing pivotally about said support pin, wherein parallax correction is carried out by pivoting said second housing about said support pin and thereby swinging an optical axis of the erecting optical system at its incidence side about said support pin.

16. The parallax correcting mechanism as definded in claim 15, wherein said support pin extends in parallel to the optical axis of said objective side optical system.

17. The parallax correcting mechanism as defined in claim 15 and further including means for moving lenses constituting said objective side optical system back and forth along the optical axis thereof to obtain a desired zooming effect corresponding to a zooming effect obtained by a photographic lens of the camera.

18. The parallax correcting mechanism as defined in claim 15, wherein said second housing includes a prism holder adapted to hold an upper portion of said erecting optical system and a prism cover for covering a lower portion of said erectiong optical system whereby said prism holder and said prism cover seal up and hold together said erecting optical system.

19. The parallax correcting mechanism as defined in claim 15, wherein said ocular side optical system is contained within said second housing.

20. The parallax correcting mechanism as defined in claim 15 and further including means for moving said ocular side optical system back and forth along its optical axis to achieve a desired diopter movement.

21. The parallax correcting mechanism as defined in claim 15, wherein a distance between said support pin of said erecting optical system and the optical axis of said ocular side optical system is shorter than a distance between the optical axis of said objective side optical system and said support pin.

22. A photographic camera comprising:

a real image type view finder including an objective side optical system, an erecting optical system, an ocular side optical system, a first housing for holding and containing said objective side optical system, and a second housing for containing at least said erecting optical system, said second housing having a support pin and supported by said first housing pivotally about said support pin, wherein said support pin is spaced from an optical axis of said objective side optical system, and wherein parallax correction is carried out by swinging said second housing about said support pin and thereby pivoting an optical axis of the erecting optical system at its incidence side about said support pin.

23. The photographic camera as defined in claim 22 and further including:

an autofocussing sensor casing; and an autofocussing device mounted in said autofocussing sensor casing, said autofocussing device including a light projector and a light receiver, wherein said first housing is mounted on said autofocussing sensor casing.

24. The photographic camera as defined in claim 23 and further including a flash tube mounted in said autofocussing sensor casing for prevention of so-called red eye phenomenon.

25. The photographic camera as defined in claim 22, wherein said erecting optical system includes a field frame plate.

26. The photographic camera as defined in claim 25 and further including field frame mask plates each pivotally movable with respect to said field frame plate between a position at which said field frame plate is partially covered and a position at which said field frame plate is not covered so that said field frame may be selectively switched between a size for normal photographing mode and a size for panoramic photographing mode.

\* \* \* \* \*